RADIO AND TELEVISION AUDIENCE SURVEY SYSTEM
Filed March 11, 1964 8 Sheets-Sheet 1
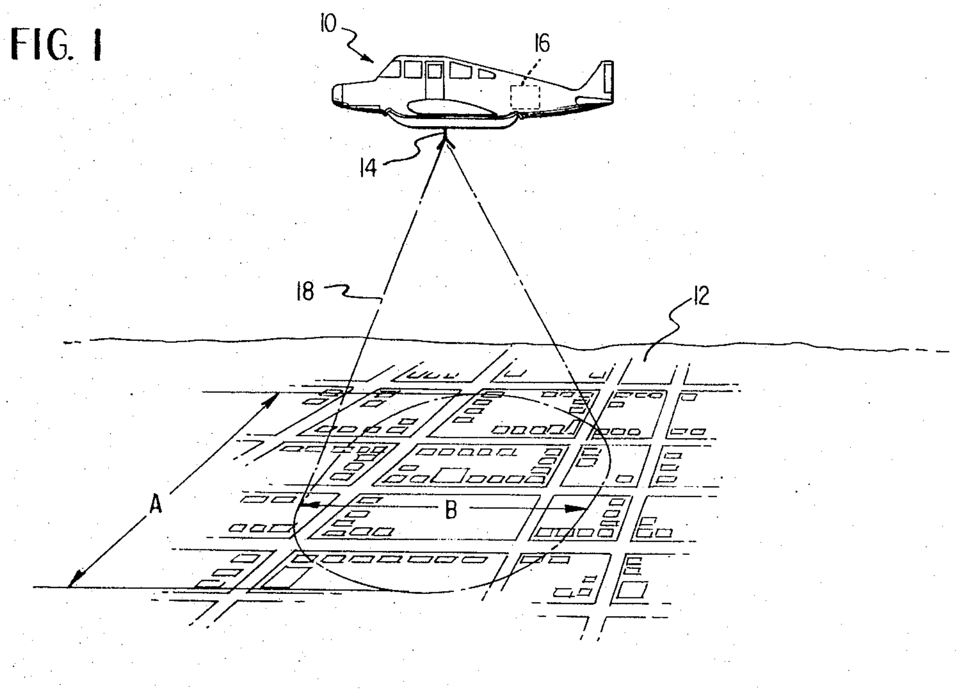
FIG. 3
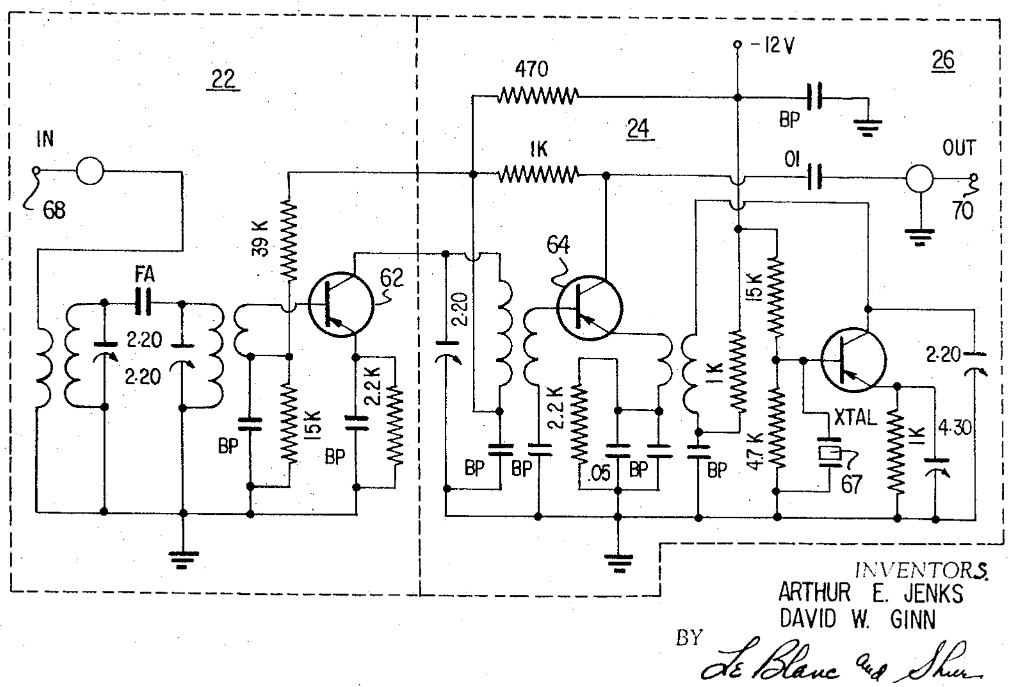
INVENTORS.
ARTHUR E. JENKS
DAVID W. GINN
BY Le Blanc and Shur
ATTORNEYS.

INVENTORS.
ARTHUR E. JENKS
DAVID W. GINN
BY Le Blanc and Shur
ATTORNEYS.

INVENTORS.
ARTHUR E. JENKS
DAVID W. GINN
BY Le Blanc and Shur
ATTORNEYS.

INVENTORS.
ARTHUR E. JENKS
DAVID W. GINN
BY Le Blanc and Shur
ATTORNEYS.

INVENTORS
ARTHUR E. JENKS
DAVID W. GINN
BY Le Blanc and Shur
ATTORNEYS

RADIO AND TELEVISION AUDIENCE SURVEY SYSTEM

Filed March 11, 1964 8 Sheets-Sheet 6

INVENTORS.
ARTHUR E. JENKS
DAVID W. GINN
BY Le Blanc and Shur
ATTORNEYS.

INVENTORS.
ARTHUR E. JENKS
DAVID W. GINN
BY Le Blanc and Shur
ATTORNEYS.

RADIO AND TELEVISION AUDIENCE SURVEY SYSTEM

Filed March 11, 1964 8 Sheets-Sheet 8

INVENTORS.
ARTHUR E. JENKS
DAVID W. GINN

BY Le Blanc & Shur

ATTORNEYS.

3,299,355

RADIO AND TELEVISION AUDIENCE SURVEY SYSTEM

Arthur E. Jenks, Bethesda, Md., and David W. Ginn, Newton, Conn., assignors to Television Audit Corporation, Winter Park, Fla., a corporation of Florida Filed Mar. 11, 1964, Ser. No. 350,969
3 Claims. (Cl. 325—31)

This invention relates to a device for monitoring the radiation from the local oscillators of radio and television receivers and more particularly to an aircraft monitoring and counting system for obtaining surveys as to the listening habits of radio and television audiences.

With the increase in cost of advertising time on radio and television stations and particularly the latter, sponsors have become more concerned with the scope of coverage afforded by advertising of this type. In recent years the television rating systems have received much publicity and are believed by some to have in more than one instance significantly contributed to the early demise of a television show. Various well known commercial rating organizations have included the Hooper ratings, Neilson and the American Research Bureau Systems among others. They have initiated a variety of methods and arrangements, both actual and proposed, including personal and telephone interrogation of the listening habits of individual users, the keeping of diaries, special attachments for recording cartridges incorporated in the monitored set, and more recently the so called "instantaneous" electronic systems including both the leased line or telephone wire systems and the radiated energy systems, the latter most commonly based upon a mobile sampling of the local oscillator energy produced from the TV sets.

A controversy has existed almost since the inception of the rating systems as to their reliability and accuracy. While many factors contribute to the overall accuracy of any rating system, two of the most pondered are the reaction factor and the sample size. The former of these two involves the question as to what effect the knowledge of the radio or TV listener that his set is being monitored has on his listening habits and whether or not there is any significant tendency on the part of such a user to watch more of the so called "high class" programs rather than programs which he might actually otherwise prefer. This factor is of course substantially nonexistent in the completely passive systems such as the local oscillator radiation systems where the radio or TV listener does not know that his set is being monitored. The full significance of this reaction type factor may never be completely understood.

The more recent "instantaneous" systems utilizing more or less permanent telephone line connections to a specially selected sample of the population in a given locality eliminates much of the time delay evidenced by the diary type systems and furthermore constitutes an improvement in the reaction factor as opposed to the earlier diary and interview systems, since with the permanent wire connection there is a tendency on the part of the user at least occasionally to actually forget that his set is being monitored. For this reason, this type of system is believed to be at least more likely to register the true preference of the set user. However, one serious disadvantage of this type of system is the expense of inserting special transmitters and wiring up to more than only a limited number of sets. While it has been urged that much useful information can be gathered based upon a statistically accurate sample of only a very few sets, the statistical work and analysis involved in preparing such a sample is expensive and time consuming. Furthermore, the refusal of even one listener to have his set monitored may completely disrupt the accuracy of a technical sample as does the move of one or more listeners in a sample to a different city or even to a different location in the sample area.

The novel aircraft survey system of the present invention avoids many of the above-mentioned difficulties by providing a passive type local oscillator system which rapidly gathers large quantities of information so that the number of sets surveyed is truly representative of the overall listening habits of an entire community being monitored. Earlier so called mobile units of the truck mounted type for sensing local oscillator radiation were seriously limited in the number of sets that could be sampled in a given time. More importantly, the reception of truck mounted units was rendered almost meaningless because of substantial ground attenuation and interference occasioned by other electrical equipment and most importantly because of the shielding and reflection effects resulting from the impingement of the high frequency radiations on the walls of buildings, homes, on trees and other surface impediments. These are all avoided in the aircraft system of this invention. Since the receiver in the aircraft is overhead, interference is minimized and the radiation has a relatively short, direct and unobstructed path from the receiver to the aircraft.

It is therefore one object of the present invention to provide a novel radiation monitor.

Another object of the present invention is to provide a novel audience survey system.

Another object of the present invention is to provide an audience survey system utilizing an aircraft mounted receiver for receiving radiations from the individual sets of radio or television users.

Another object of the present invention is to provide a novel analysis and counting circuit for audience survey systems.

Another object of the present invention is to provide a novel aircraft antenna for receiving ground radiations.

Another object of the present invention is to provide a novel receiver and counting system adapted to be mounted in an aircraft and to receive carrier signals from the local oscillators of individual radio or television receivers. A basic property inherent in local oscillator signals that permits them to be counted individually is the fact that they are dispersed in frequency. The present system employs a sufficiently narrow band pass filter so that any single local oscillator may be isolated. By construction of the heterodyne receiving equipment of this device, the effective center frequency of the band pass filter is scanned over the spectrum where the local oscillator carriers are distributed and each time the center frequency aligns with the local oscillator carrier an energy peak is reached at the filter output. The peaks reached by successive alignment of the signals are detected and applied to the input of a digital counter.

Thus, for a given group of incoherent signals, the actual number of signals may be determined to a high degree of accuracy. Further, if the band pass filter is followed by a circuit demonstrating a linear function of delay vs. frequency, the output energy will be compressed to a unit pulse in the limiting case. This results in the system having a frequency response equal to the band pass of the filter, with almost infinite capability of signal separation, when the sweep rate is matched to the delay vs. frequency function of the delay network.

These and further objects and advantages of the invention will be more apparent upon reference to the following specification, claims and appended drawings, wherein:

FIGURE 1 is a schematic view illustrating the overall aircraft monitoring system of the present invention;

FIGURE 3 is a detailed circuit diagram of one of the amplifier and mixer portions of the block diagram of FIGURE 2;

Figure 2:
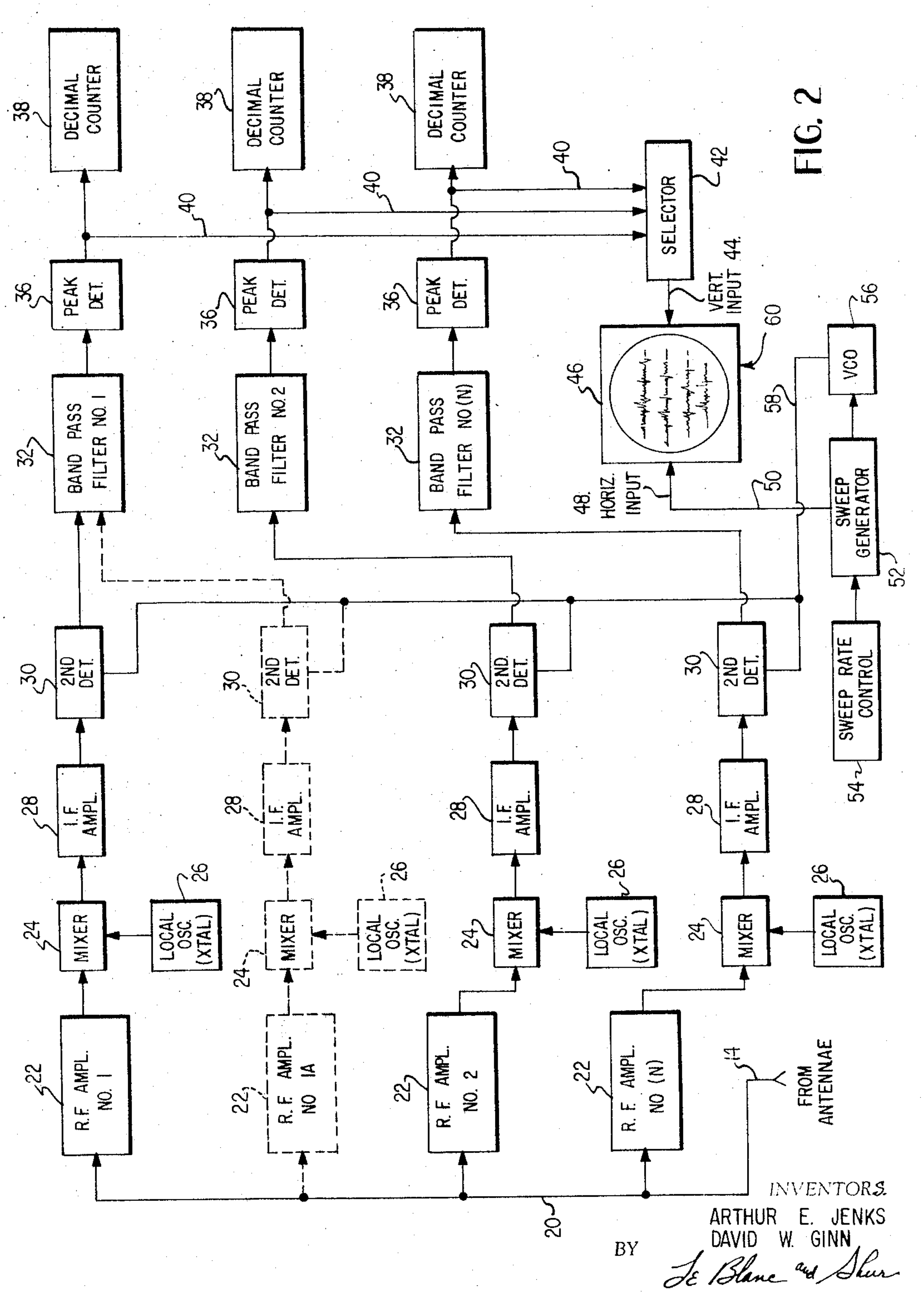
FIGURE 2 is a block diagram showing the overall receiving and counting equipment of the present invention mounted in the airplane of FIGURE 1.

A survey system, to be at all comprehensive, must be factual and truly representative of the entire viewer population. Any attempt at mass audience reaction analysis is diluted by operational economics and the results may be warped and distorted by extrapolation techniques.

The system herein described is based upon the use of a mass sampling technique and the statistical result is what X number of viewers are viewing at Y place and at Z time. No audience reaction is involved—instead a mass census of the viewing population, as related to real time, is produced. Based upon the subject device and operating technique, a sampling area of 190 sq. miles of heavily populated community or one million plus receivers can be covered in any given 30 minute period. This is based upon the fact that according to the latest available information, there are more than 90 million TV receivers in operation in the continental United States. The majority of these receivers are located in metropolitan areas comprising about 14 locations. In other words, 50% of the U.S. population reside in less than $\frac{1}{20}$ of the total area in the United States. Furthermore, the majority of the metropolitan complexes have TV transmission from two or more broadcast stations. The survey activity is necessarily confined to the more dense localities having two or more stations, since there is no point in surveying an area with a captive audience (one station only).

The measurement of radiation from radio or TV local oscillators is not new as a method of determining listener census and previous techniques have been employed utilizing mobile truck mounted ground-based equipment. Insofar as applicants are aware, these systems have not been commercially successful, since with a ground-base operation, the relatively weak local oscillator signal is more often lost in local noise or attenuated by the radiation characteristic of the receiving antenna, thereby rendering the ground method extremely slow and ineffective. Of course, even truck mounted equipment cannot be rapidly moved from place to place so as to obtain a truly large measurement in a short time.

The reverse of this is true with airborne equipment. The allowable radiation from local oscillators according to FCC standards is a protection limit, mainly to eliminate local interference. The following is quoted from FCC T.S. LL (61)-6:

15.62 RADIATION INTERFERENCE LIMITS (a) The radiation from all radio receivers that operate (tune) in the range 30 to 890 m.c./s., including frequency modulation broadcast receivers and television receivers, manufactured after the effective date specified in 15.68 shall not exceed the following field strength limits at a distance of 100 ft. or more from the receiver:

| Frequency of radiation: | Field strength ($\mu$v./m.) |
|---|---|
| 0.45 up to and including 25 | see paragraph (b). |
| over 25 up to and including 70 | 32. |
| over 70 up to and including 130 | 50. |
| 130 to 174 | 50–150 (linear interpolation). |
| 174–260 | 150. |
| 260–470 | 150–500 (linear interpolation). |
| 470–1,000 | 500. |

It is important to note that the above FCC standards are based upon ground measurements.

Surprisingly enough, the strength of the local oscillator signals passing up into the air have been found to be much stronger even though within the ground limits set by the FCC. Airborne measurements as determined by data system tests have revealed signal strengths of 3–10 microvolts measured at the receiver at an altitude of 3500 ft. above terrain. Attenuation at these frequencies, per mile of altitude, is negligible. As a matter of fact, the local oscillator signal pattern reaches a peak directly over the receiver antenna and the signal strength is sufficient to be readable and identifiable above the noise level at altitudes from 4000–6000 ft. above terrain.

Referring to FIGURE 1 there is shown a multi engine aircraft 10 passing over densely populated terrain 12 such as a city or other metropolitan area. Fixedly mounted to the underside of the aircraft 10 is an antenna 14 coupled to signal analyzer equipment indicated by the dashed box 16 within the aircraft, which equipment includes suitable receiving and counting circuits.

Antenna 14 has a half power radiation pattern of the type illustrated at 18 in FIGURE 1 which is preferably fan shaped but may be slightly elliptical, especially at the ends as shown. The axis A transverse to the direction of travel of the airplane is preferably about 2 times the length of the antenna pattern axis B lying in the vertical plane of the direction of travel of the airplane, but may be as much as 6 times the length of the axis B. Thus, as the aircraft moves over the ground the radiation pattern of the antenna 14 incident on the ground from an altitude of several thousand feet sweeps across a sizeable area of the landscape.

A monitoring aircraft of this type may provide a measurement service with an around the clock, all-weather capability. In order to provide such a service it is preferred that the aircraft 10 be a multi engine aircraft with airline type equipment and personnel with substantial navigational training. In addition to the regular airline equipment carried for VHF navigation and communications, the aircraft preferably is equipped with two DME receivers modified to provide a "start" and "stop" pulse to the sampling equipment. This provides RHO-RHO information from two ground stations accurate to plus or minus $\frac{1}{10}$ mi. All metropolitan areas studied have reception coverage at the flight level anticipated from two or more DME ground stations, and the resulting arcs of distance information provide a very accurate fix when precomputed. This information can be used to up-date or verify the aircraft navigation from the Doppler navigator/computer. The total package of this type provides the accuracy necessary for the survey work and the resulting flight planning and flight following information desired for accurate and immediate position knowledge in a metropolitan complex. A single aircraft traveling at ground speeds in the neighborhood of 150 mi. per hr. can cover as much as 380 sq. mi. of populated area or more than two million receivers in any given 1 hr. period. The results of a survey flight of six hrs. duration, for example, from 6:00 p.m. to 12:00 p.m. is available for computer analysis within minutes after landing.

FIGURE 2 is a block diagram of the overall signal analyzer equipment 16 of the present invention mounted in the aircraft 10 of FIGURE 1. From the antenna 14 the received radiations signals pass by way of lead 20 to a plurality of receiver channels each including an RF amplifier 22. The maximum number of stations listed for any given area is nine so that in order to cover such an area at least nine receiving channels are required. The signals from the RF amplifiers pass to the mixers 24 where they are mixed with signals from the crystal controlled local oscillator 26. The local oscillators for each channel operate at a different frequency so that the signals received at each of the RF amplifiers 22 is heterodyned down to a common IF frequency signal which is passed through the IF amplifiers 28. The output from the IF amplifiers are coupled to second detectors 30 where the frequency is further reduced by a heterodyne process and the output of the second detector is applied to one of the band pass filters 32. The energy peak coming out of the filters are sensed by peak detectors 36 and these peak detectors produce output pulses which are counted by decimal counters 38. The peak detector operates to provide the time derivative of the bandpass filter output. Thus, a zero crossing is generated each time an energy peak is reached at the bandpass filter. The peak detector zero crossing has a positive slope that is used to advance the digital counter.

The circuit consists of a resistor-capacitor coupling network, the time constant RC product being short with respect to the duration of the bandpass filter output, followed by an isolation amplifier similar to the one employed in the bandpass filter. The decimal counters may be of any suitable construction but are preferably of the type manufactured by Hewlett Packard, model 5212 or 5512.

At the same time that the pulses applied to the decimal counters 38 they are also applied by way of leads 40 to a selector switch 42 and by way of selector switch 42 to the vertical input 44 of a monitor oscilloscope 46. The horizontal input 48 of oscilloscope 44 is coupled by way of lead 50 to a sweep generator 52. The output of sweep generator 52 is under the control of a sweep rate control device 54 and acts on a voltage controlled oscillator 56 so as to cause the output of the oscillator to be swept over a spectrum of frequencies in accordance with the output sweep of the generator 52. This variable spectrum of frequencies is applied by way of lead 58 from the output of the voltage controlled oscillator 56 to the second detectors 30 of each of the receiver channels.

As previously pointed out, since in some areas there are as many as 9 TV channels there should be at least 9 receiving channels in the unit 16 of FIGURE 2 and this is indicated by the RF amplifiers labeled as No. 1 and No. 2 and etc. for each channel until channel No. N is reached. However, present TV receivers in service employ either of two IF frequencies; namely, 21.9 or 41.25 mcs. This fact requires that two survey receivers per TV channel being monitored, be provided, plus a bandpass filter and counter for each channel. In the preferred embodiment illustrated in FIGURE 2, the receivers are 24 in number allowing 18 receiver channels for the 9 possible TV channels in a given area, plus 6 extra receiver channels as spares and for testing.

In FIGURE 2 the second receiving channel in the circuit for the TV channel to be monitored by receiving channel No. 1 is illustrated in dash lines and identified as No. 1A appearing in the box for the RF amplifier. For example, receiving channel No. 1 might monitor all TV sets tuned to channel 7 and employing an IF frequency of 21.9 mcs. Receiving channel No. 1A may similarly monitor all TV sets tuned to the same TV channel 7 but utilizing an IF frequency of 41.25 mcs. Since both of these receiver channels monitor the same television channel the output from the second detector 30 is preferably connected directly to band pass filter No. 1 and a separate band pass filter is not required. Thus, in the system illustrated 24 receiver channels are required, but only half that number of band pass filters, peak detectors and decimal counters need be provided since a single band pass filter accommodates two receiver channels. This significantly reduces the amount of equipment load aboard the aircraft and simplifies the totalizing process.

The count is obtained by employing the spectrum analyzer technique, where a local oscillator is swept through a frequency range and the heterodynes produced by incoming signals are detected at the output of the band pass filters. The optimum sweep rate and filter pass band are functions of the number of carriers distributed in the band of interest, the stability of the carriers, the ambient noise level or presence of the interfering signals and the speed of the aircraft. For the system illustrated, a sweep rate of from 2 to 10 seconds is preferred requiring the band width of the filters 36 to be between 50 and 200 cycles per second.

The monitor oscilloscope 46 is provided to normalize receiver gain and to determine the validity of the count being recorded. A raster type display is presented on the oscilloscope to the operator, as illustrated at 60, with each baseline associated with its own band pass filter. Thus, a spectrum display of all channels being surveyed is available, allowing incorrect counts resulting from excessive noise or interference to be negated at the operator's option.

The reason for providing separate channels for each group of local oscillator signals is that at television frequencies the various channels are widely separated and it is not at the present time possible to employ common circuitry having sufficient band width to detect all settings of the various local oscillators. For example, the most commonly used channels for TV operate at from 80 to 130 mcs. and from 200 to 260 mcs., thus necessitating an antenna 14 having approximately 3 to 1 band width. The unit of FIGURE 2 has been described in conjunction with such reception and while the same overall system can be made to function for reception in the UHF band, that is from 450 to 900 mcs., suitable modification of the equipment must be made and a separate antenna is required. It should be pointed out that operation over this higher band poses no serious difficulty since similar arrays may be used with the element size and phasing commensurate with the portion of the UHF spectrum that is being worked at the time.

The operation of the system of this invention is based on the fact that while the local oscillators in all of the same type of sets tuned to a particular TV channel are theoretically operating at the same frequency they are in fact operating at slightly different frequencies, each peculiar to the parameters, tuning adjustment etc. of the individual set. By employing band pass filters 32 of a sufficiently narrow pass band, any single local oscillator may be isolated, since the output from the filter will peak at the instant that the frequency of the local voltage control oscillator 56 is equal to the frequency of the incoming signal in second detector 30. Of course, certain inaccuracies do exist in that some signals may be lost in noise, movement of the airplane will produce some variation, and other factors may exist which may tend to make the sample not completely accurate. However, for the most part, these inaccuracies average out and even when they do not, the size of the sample is so great i.e. millions of sets, that on a percentage basis the survey is extremely accurate.

FIGURE 3 is a detailed circuit diagram illustrating with component values suitable transistor circuits comprising the RF amplifier 22, mixer 24 and local oscillator 26. Amplifier 22 includes a transistor stage 62, while the mixer includes transistor 64 and the local oscillator a transistor 66. The frequency of the local oscillator is controlled by a crystal 67 and the output is taken from the collector of mixer transistor 64 at output terminal 70. Input from the antenna is to input terminal 68 of the RF amplifier.

Figure 4:
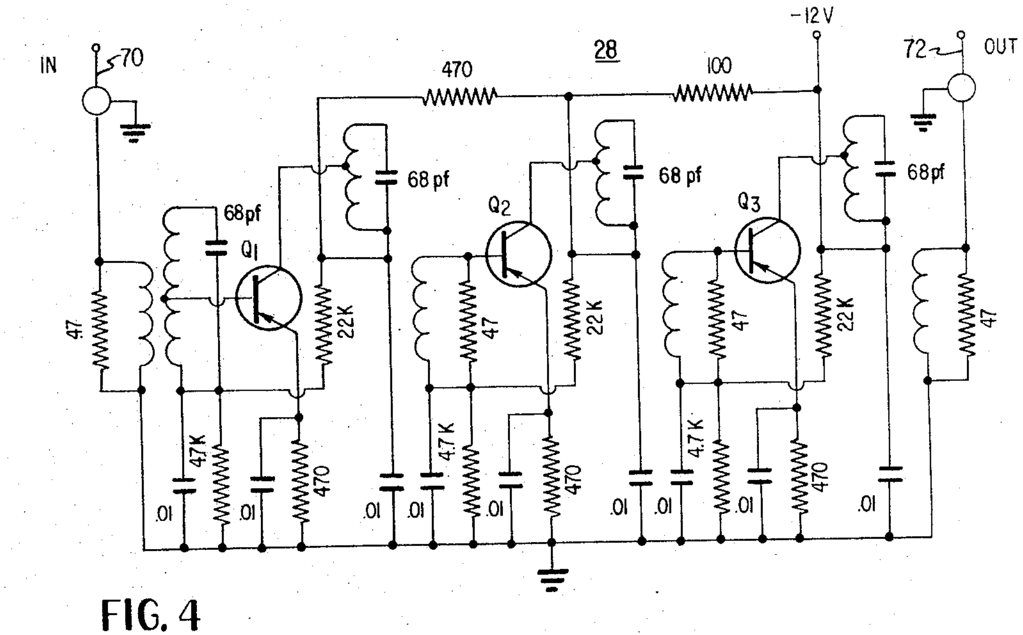
FIGURE 4 is a detailed circuit diagram of one of the IF amplifiers of FIGURE 2.

FIGURE 4 is a detailed circuit diagram of one of the IF amplifiers 28 of FIGURE 2. The IF amplifier includes 3 transistors labeled Q1, Q2 and Q3 operated from a negative 12 volt power supply. Output to the second detector 30 is by way of output terminal 72.

Figure 5:
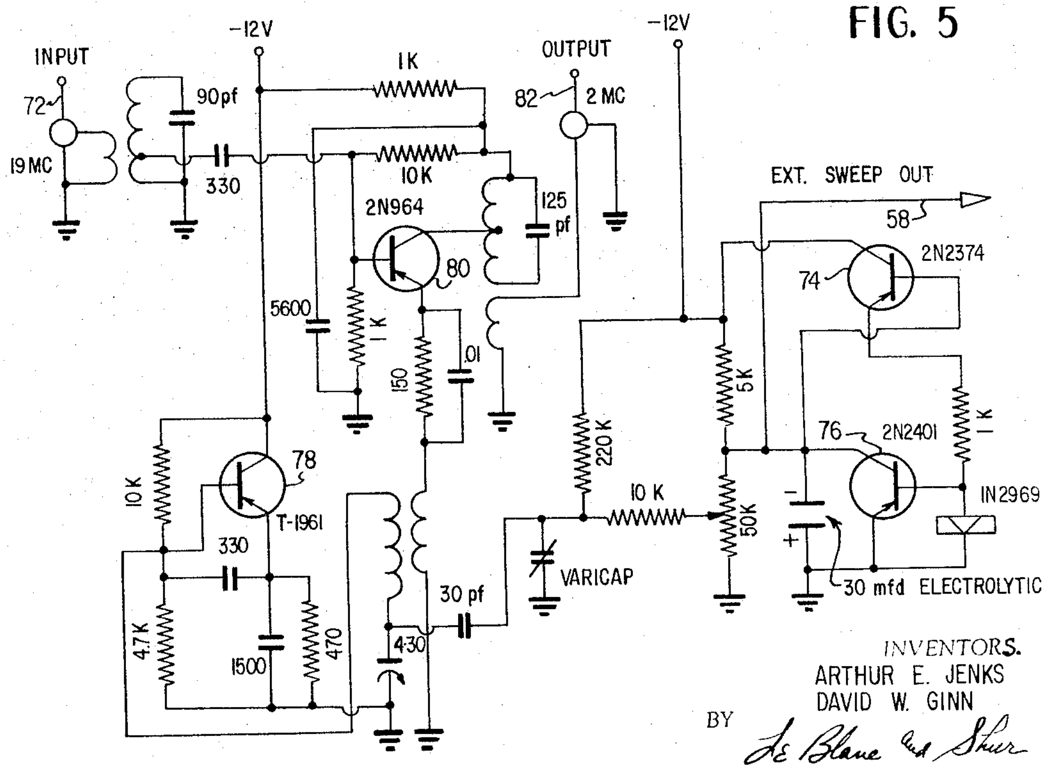
FIGURE 5 is a detailed circuit diagram of a first portion of one of the second detector circuits of FIGURE 2.
Figure 6:
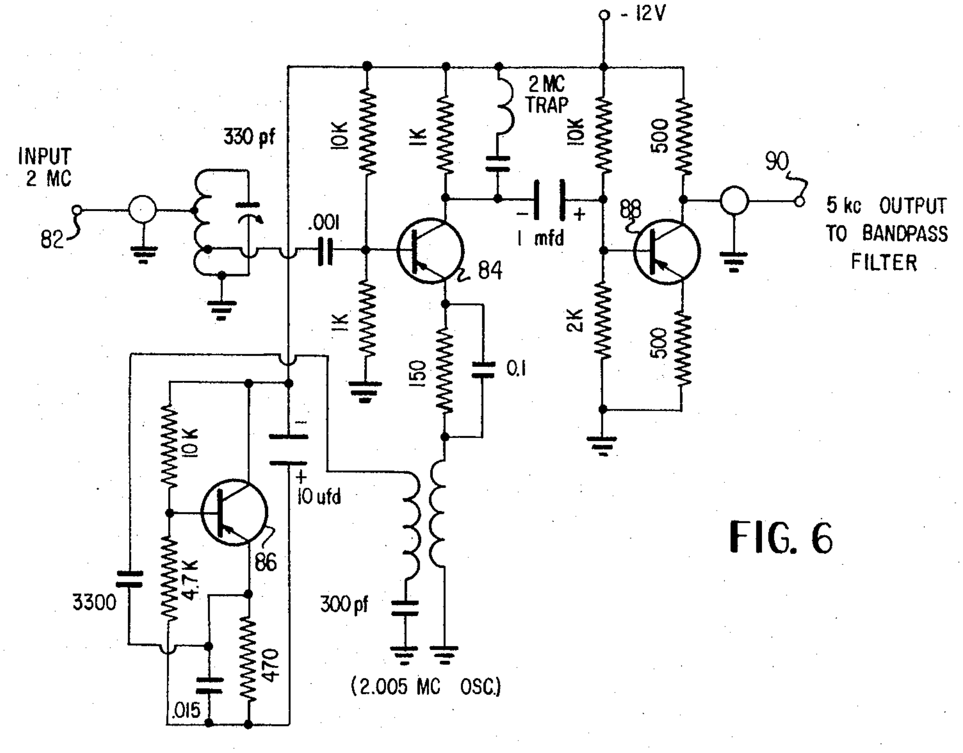
FIGURE 6 is a circuit diagram of a further portion of one of the second detector circuits of FIGURE 2.

FIGURES 5 and 6 show a detailed circuit diagram of one of the second detectors 30. In the circuit of FIGURE 5, the incoming IF signal on lead 72 is at a frequency of approximately 19 mcs. and this is beat down by the sweep from voltage controlled oscillator 56 applied by way of lead 58 to a pair of transistor 74 and 76, a third transistor 78 and a mixing transistor 80 so that the carrier at the output terminal 82 in FIGURE 5 is nominally at 2 mcs. Referring to FIGURE 6, this two mcs. signal is mixed in mixer transistor 84 with a signal from a second local oscillator including transistor 86 so that the nominal output i.e. the center frequency of the output by way of amplifier transistor 88 and output terminal 90 is 5 kilocycles.

Figure 7:
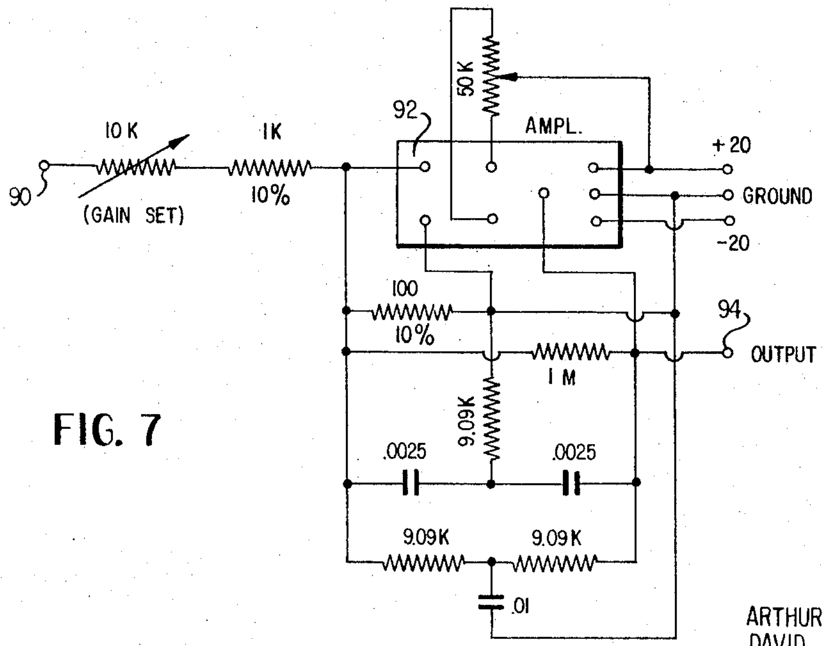
FIGURE 7 is a detailed circuit diagram of one of the band pass filters in FIGURE 2.

FIGURE 7 shows the details of a band pass filter 32 with the 5 kc. center frequency signal appearing at input terminal 90 applied to a suitable amplier 92. The unit acts as an active band pass filter with the output signal to the peak detector appearing at output terminal 94.

Figure 8:
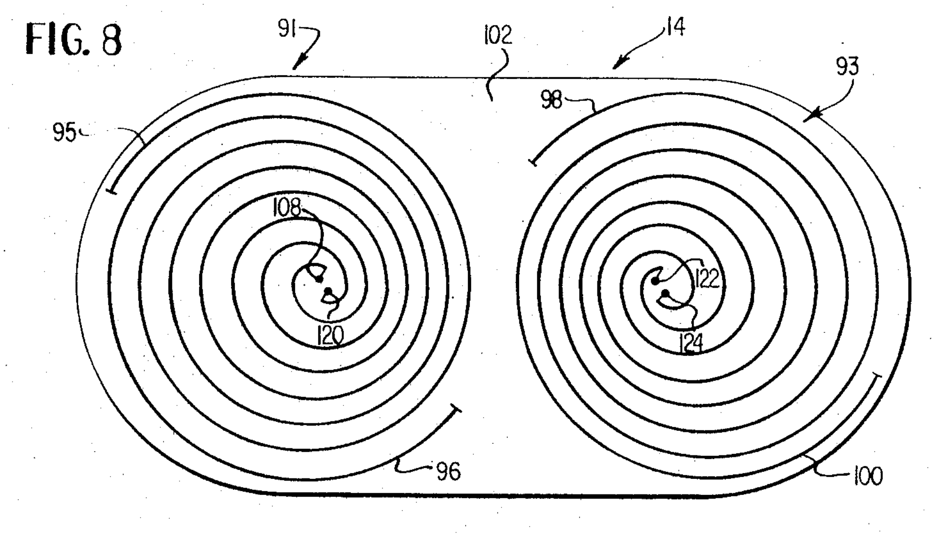
FIGURE 8 is a bottom view of a preferred antenna constructed in accordance with the present invention.
Figure 9:
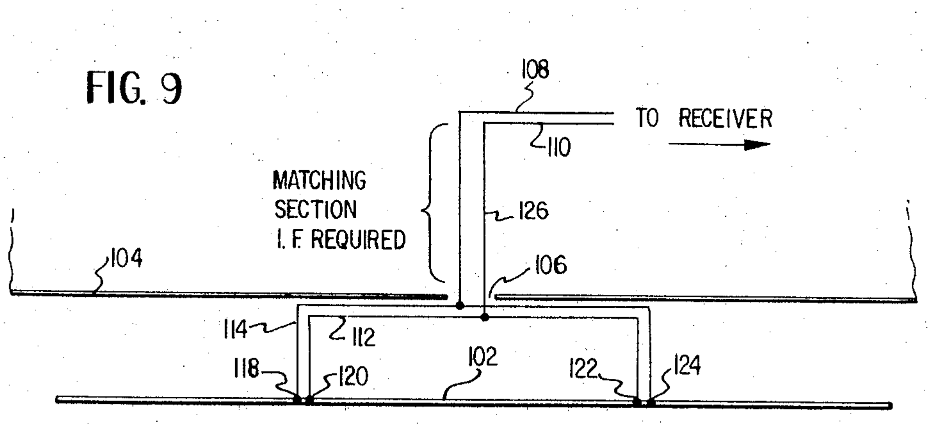
FIGURE 9 is a side view of the aircraft antenna of FIGURE 8.

As previously pointed out, an antenna 14 of known directional characteristics is employed to enable adjustment of aircraft speeds that provide complete coverage of a given strip of surface area. The antenna polarization is critical and must be oriented in the horizontal E plane for proper coupling of radiant energy to the array. Ideally, a circularly polarized antenna for detection of energy, with a vertical Poynting's vector, provides optimum results regardless of the relationship of a TV receiver dipole with respect to aircraft heading. While various antenna configurations can be utilized FIGURES 8 and 9 show a preferred arrangement for the antenna 14 of this invention.

The antenna consists of an array of two planar spirals 91 and 93 (approximately spirals of Archimedes) spaced nominally one half-wave length apart and mounted approximately one quarter wavelength from a relatively flat ground plane. Each spiral contains two arms such as arms 95 and 96 of spiral 91 and arms 98 and 100 of spiral 93 and these two arms of each spiral are 180° out of phase.

When the terminals of the spirals are driven with an appropriate voltage source, traveling wave currents will progress out the spiral. The direction of the currents are more or less random until the circumference of the spiral approaches one wavelength. At this radius the currents are instantaneously in the same direction on opposite sides of the spiral and the currents in adjacent turns are nearly in phase. The radiation pattern approaches the E plane pattern of a short dipole which is given by cosine $\theta$. Polarization is circular and the spirals can be made to yield excellent patterns over a frequency band of 3 to 1 or more. Typical gain is 9 db above isotropic. The spiral should have outside turns that are at least one wavelength in circumference at the lowest frequency (4 ft. dia. at 80 mcs.) and the inside turns should be less than one wavelength in circumference at the highest frequency (1 ft. dia. at 238 mcs.).

By arraying the two spirals one half wave apart the voltage pattern becomes a cosine squared pattern which reduces the beam width in the plane of the array axis. To keep the effective spacing reasonably close to a half-wave length over a 3 to 1 bandwidth the spirals are skewed slightly as illustrated in FIGURE 8 so that the distance between centers of turns becomes less as the turns become smaller.

The spirals are preferably fabricated from No. 10 copper wire which is cemented by suitable adhesive to an oval or elliptically shaped flat sheet of fiberglass 102. The whole antenna is preferably covered with fiberglass dome shaped to conform with the aircraft contour. The aircraft metal skin illustrated at 104 in FIGURE 9 provides a ground-plane and includes an aperture 106 through which the transmission line passes. The feed lines 108 and 110 to the receiver are preferably coupled to the mid-point of a pair of additional feed lines 112 and 114 in turn coupled to the center terminals 118 and 120 of spiral 91 and 122 and 124 of spiral 93.

The spacing from the ground-plane or metal skin 104 of the airplane is preferably about 1 foot. Antenna 8 so mounted near the conducting ground-plane do not receive horizontally polarized signals from the horizon because of the shorting effect of the ground-plane. This insures a good null in the horizontal direction for the antenna.

The spirals are normally fed at the center with balanced transmission lines and the impedance is approximately 150 ohms. The spirals are connected together with equal lengths of 150 ohm line, 112 and 114 and further connected by a balanced 75 ohm line 108 and 110 from the receiver to the common parallel point. Should it become necessary to provide additional impedance matching, a tapered (broadband) section 126 can be employed and baluns can be used if an unbalanced input is required.

In general the antenna specifications for the antenna of FIGURES 8 and 9 is that the pattern is a fan shaped beam directed straight down from the aircraft with 90° half-power beam width from side to side and 45° beam width fore and aft. Gain in the horizontal plane is down at least 20 db below the beam peak. The gain is 9 db or more above an isotropic antenna with corresponding polarization and the polarization is circular (2 db axial ratio). The impedance is a 75 ohm balanced transmission line with a voltage standing wave ratio of 3 to 1 or less.

Figure 10:
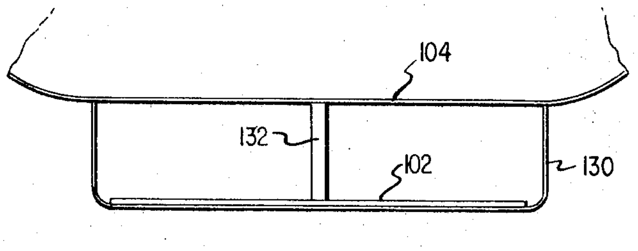
FIGURE 10 shows the manner of mounting the preferred antenna of FIGURES 8 and 9 on the aircraft.

FIGURE 10 is a cross section through the $\frac{1}{16}$ of an inch fiberglass plate 102 and shows its mounting in a fiberglass dome envelope 130. The coaxial feed cable making up lines 112 and 114 of FIGURE 9 is illustrated at 132 in FIGURE 10.

Figure 11:
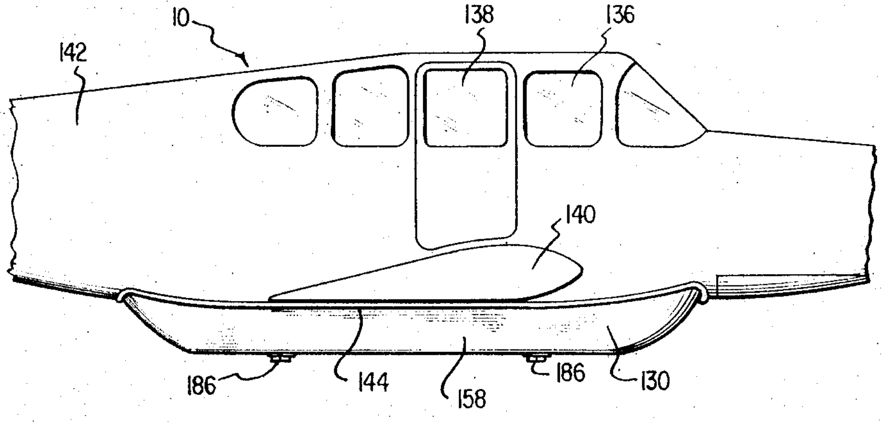
FIGURE 11 is a side view of the aircraft antenna dome.
Figure 13:
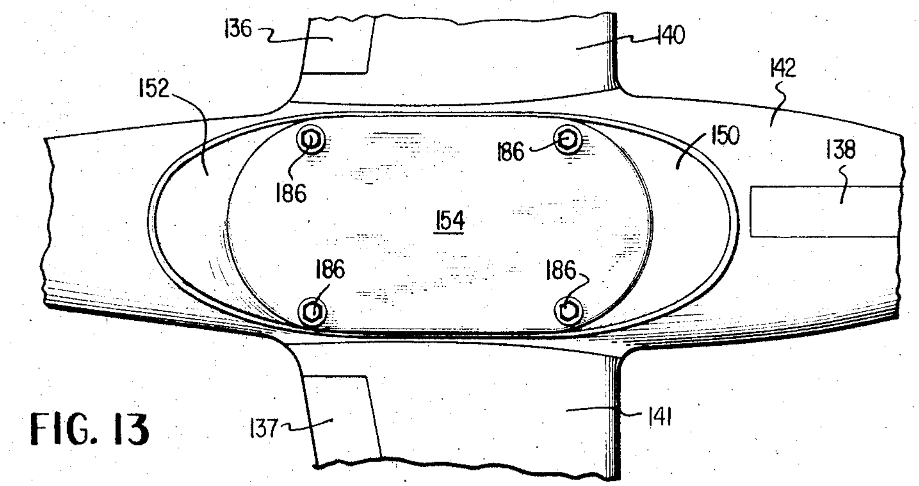
FIGURE 13 is a bottom view of the antenna dome on the aircraft.
Figure 12:
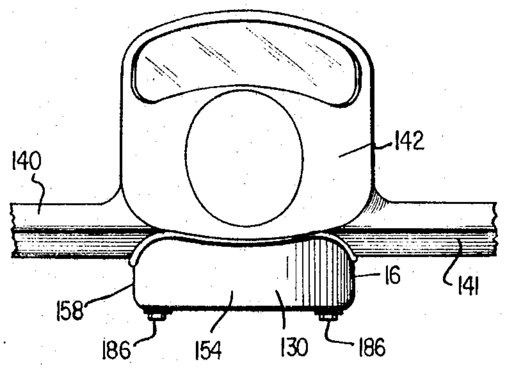
FIGURE 12 is a front view of the antenna dome of FIGURE 11.
Figure 14:
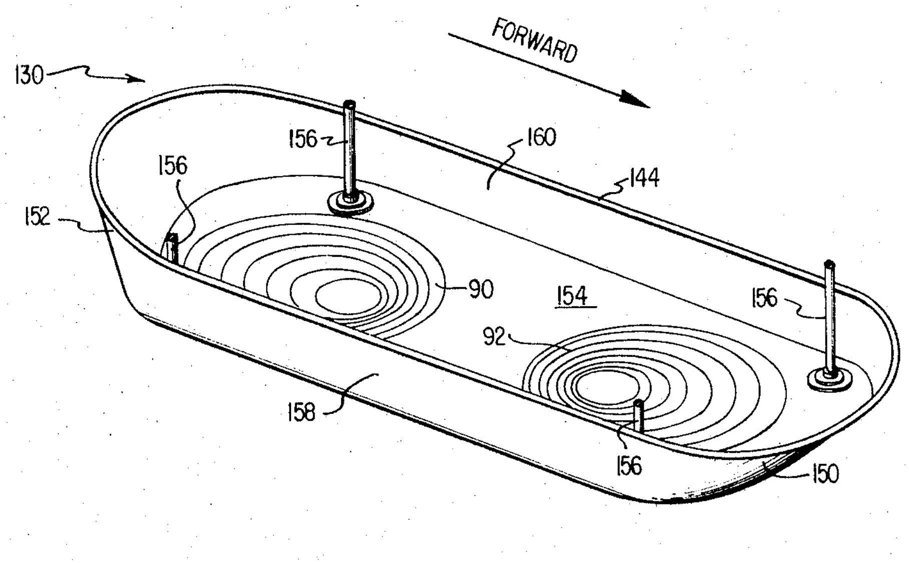
FIGURE 14 is a perspective view showing the antenna mounted in the fiberglass dome.

FIGURE 11 is a side view of the twin engine aircraft 10 having a cockpit 136 and a door 138. FIGURE 12 is a front end view and FIGURE 13 is a bottom plan view of the same structure. FIGURE 14 is a perspective view of the dome interior. The dome 130 is shown beneath the wing 140 and is secured to the bottom of the fuselage 142 by a rubber molding 144. The fiberglass dome 130 is illustrated as contoured to 50 fuselage. The dome is positioned between the wings adjacent the flaps 136 and 137 and just behind the nose wheel well door 138 of the aircraft. The dome has outwardly opening upper portions 150 and 152 at the front and rear respectively which taper downwardly to a flat bottom or floor 154 which floor is apertured at each of its four corners to receive connectors for corner supporting struts 156. The sides 158 and 160 of the dome are substantially straight.

Figure 15:
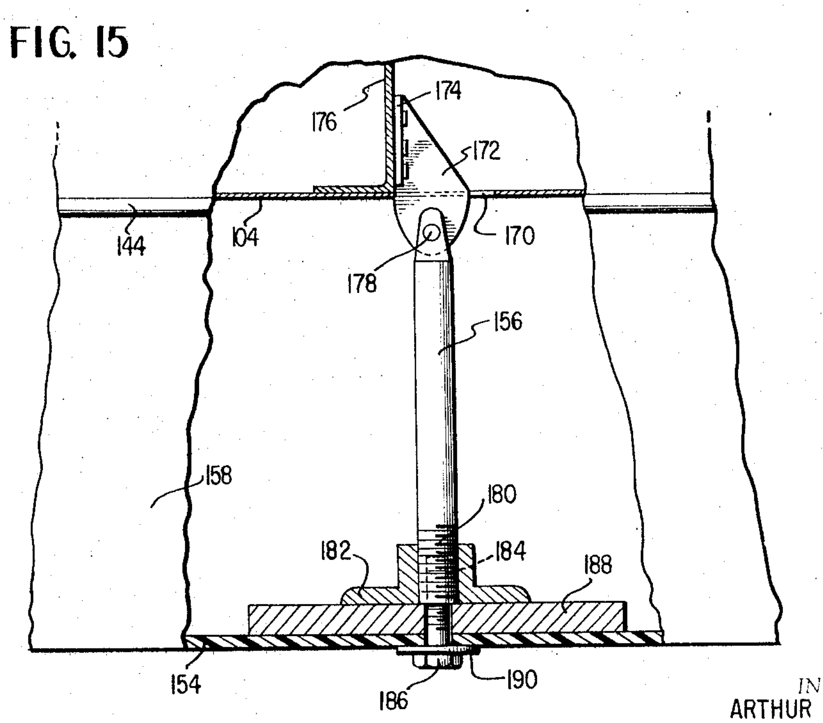
FIGURE 15 is a cross section showing the manner of attachment of the dome to the aircraft.

FIGURE 15 illustrates the manner in which the dome is supported beneath the aircraft and illustrates in detail one of the supporting struts 156. It is understood that the remaining three corner struts are similarly constructed.

The metal skin 104 of the aircraft is apertured as at 170 and a strut pad 172 passes through this aperture and is secured by means of bolts passing through a flange 174 in the pad to a structural member of the aircraft i.e., the former 176. The upper end of the strut 156 is secured to the pad 172 by a pin 178.

The lower end of the strut 156 is externally threaded as at 180 to receive an adjustment flange 182. This lower end is also internally threaded at 184 to receive the threaded end of a bolt 186 passing through the bottom 154 of the dome and through a stiffener 188. The head of the bolt 186 is spaced from the underside of the dome by a washer 190.

Figure 16:
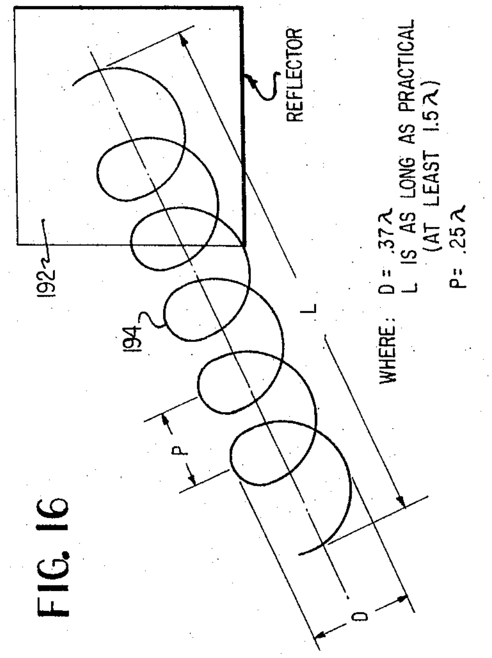
FIGURE 16 shows a modified aircraft antenna construction.

Although the twin spiral construction of FIGURES 8 and 9 represents the preferred construction of the antenna 14, a modified antenna structure which may be used in the survey system of this invention is illustrated in FIGURE 16. In this embodiment the antenna is of the helical type and comprises a reflector 192 positioned adjacent a helical coil 194. This helical antenna is highly directional in the direction of the axis of the helix and is mounted vertically under the reflecting surface 192 (the skin of the aircraft) for receiving horizontal E Plane energy from below the aircraft . In FIG. 16 $D=.37\eta$, L is as long as practical (at least $1.5\eta$) $P=.25\eta$ and $\eta$ is the wavelength at the upper frequency.

Figure 17:
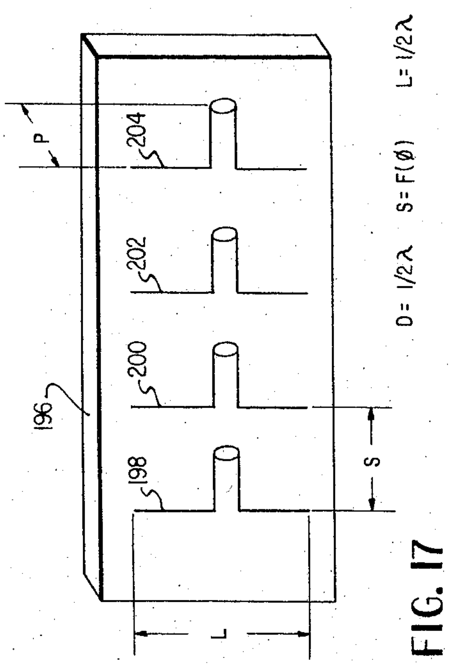
FIGURE 17 shows a further antenna useable in the system of this invention.

FIGURE 17 shows a further modified antenna construction useable in the system of the present invention involving a narray of dipoles which are phased to increase directivity and mounted one-half $\eta$ from a reflector (again the aircraft skin) 196 to provide a single lobe of sensitivity. All of the dipole elements 198, 200, 202 and 204 of the collinear array of FIGURE 17 have equal length feed lines connecting to a common point $S=\frac{1}{2}\eta$ for maximum directivity perpendicular to the reflector and minimum response to signals originating in the plane of the reflector. This antenna is linear in polarization, requiring the aircraft to follow radials from the transmitted being sampled in order that the dipoles in the collinear array are parallel with dipoles in the antenna radiating the local oscillator signal. Thus, if the dipoles of the collinear array are parallel with the roll axis of the aircraft, circles of constant radius may be flown from the TV transmitter being sampled; and if parallel with the pitch axis, radials are flown. Any number of dipole elements may be employed, and phasing is adjusted by changing the feed line lengths to accommodate various values of S. Two arrays aligned at right angles may be connected in parallel to yield circular polarization, making flight path independent of station bearing.

Figure 19:
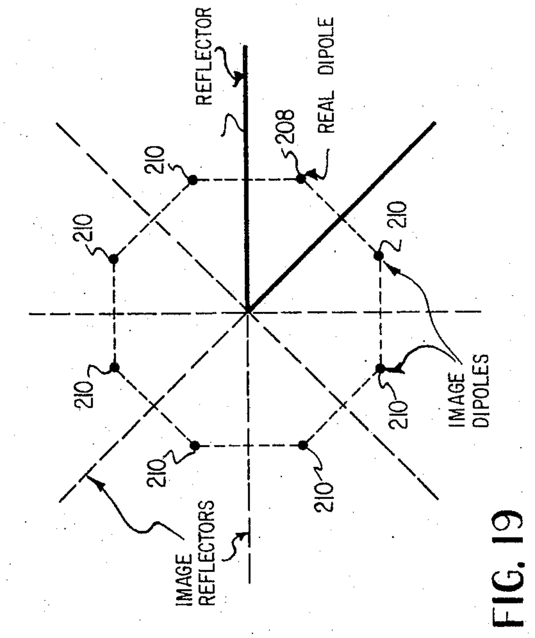
FIGURE 19 illustrates the action of the antenna system of FIGURE 18.
Figure 18:
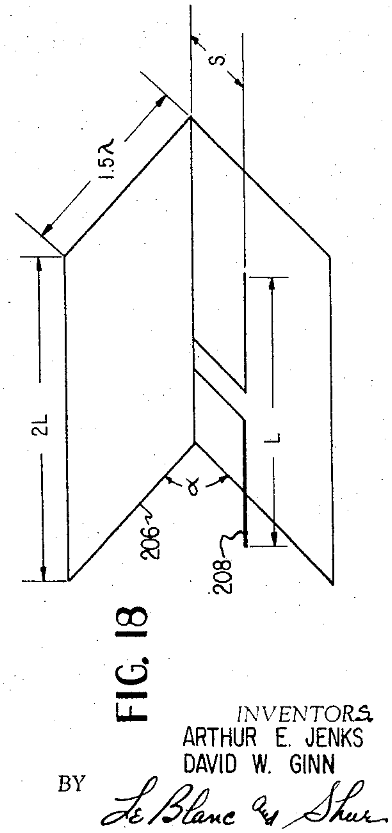
FIGURE 18 shows a still further corner reflector type antenna useable in the system of this invention.

FIGURE 18 illustrates a corner reflector type of antenna which may be utilized in the present invention. The effect of an array of dipoles may be accomplished by the corner reflector where the reflector 206 is provided with a dipole 208. If the reflector is bent to define an acute angle $\alpha$ of 45° viewed along the axis of the corner and dipole, the antenna may be seen to equal an array of eight dipoles by the image equivalent. This is illustrated in FIGURE 19 showing the seven image dipoles 210 in addition to the real dipole 208. Thus, an effective array of eight dipoles, properly phased for maximum directivity in the direction of the bisector is obtained. This antenna array requires the dipole to be aligned in parallel with the reradiating set antenna being sampled, as in the case of the single collinear array. The corner reflector also offers the advantage of being wideband above the minimum design frequency as far as the passive reflector 206 is concerned. Therefore, separate dipoles for each frequency of interest may be placed within the reflector with negligible interaction with one another. The highest frequency dipole is positioned nearest the apex of the reflector and is the smallest. The lowest frequency dipole will be furtherest from the apex and have the longest dimension. Spacing of the dipoles from the apex is ½ wavelength for the frequencies they are to cover.

Since all of the image dipoles are effectively in electrical parallel with the reel dipole, the smaller angle becomes the greater the number of dipoles in the array, the greater the directivity and the lower the radiation resistance. A practical limit is reached at $\alpha=30°$ where radiation resistance becomes so small (5 ohms) that further gains in directivity are offset by matching losses in the transmission system coupling the antenna to the receiver.

The sizes of all the antenna arrays employed are given in terms of wavelengths and may be calculated from the equation, $\eta=C/F$, where F is the frequency and C is the velocity of propagation of the electromagnetic energy. It may be seen that if C is reduced, the size of the antenna may be reduced. By immersing any of the arrays described in this disclosure in a material having a dielectric constant greater than unity, the physical size is reduced by a factor of K, the dielectric constant.

Materials such as barium titanate may be employed to yield K factors up to 6,000 but have relatively high loss factors. Several gases offer high dielectric constants with low loss factors, which allows construction of closed systems with greatly reduced dimensions. To avoid heavy construction necessary to restrain pressure differentials of several pounds per square inch (p.s.i.) in a large antenna, the gases can be contained in small lightweight pressure cells in the form of a closed sphere.

For example, the helical antenna 194 of FIGURE 16 can be placed in a dielectric filled cylindrical cavity. The antenna resembles a helical spring inside a can of diameter $\eta/K$. The diameter of the helix is $\eta/\pi K$.

It is apparent from the above that the present invention provides a novel monitoring system particularly suited for use in surveying the listening habits of radio and television listeners and particularly the latter. Important features of the present invention include:

(a) sufficient sensitivity in the receiver to amplify received low oscillator signals to a level sufficient to drive a counter.

(b) a sufficiently good noise figure in the receiving equipment to provide a relatively noise-free signals to the counters.

(c) reference frquency stability at least one order of magnitude improved over the signals being received.

(d) sufficient antenna directivity to enhance desired signals while surpressing interference from strong unwanted sources such as FM stations.

(e) a sweep rate more rapid than the frequency drift of the local oscillator signal to prevent multiple counting of one signal.

(f) circular polarization of the antenna system to allow reception of signals regardless of degree of polarization.

(g) sufficient bandwidth of the filters to allow counting of significant statistical quantities within a 30 minute period, and (h) sufficient system mobility to provide area coverage in accordance with the statistical requirements of sample numbers as well as location samples.

When it is understood that in some instances analysis of the listening habits of several million people may be based upon samples as small as only a few hundred, sometimes even less than two hundred, it will be clear that the system of the present invention provides a substantial increase in accuracy where it is possible to sample even with only one aircraft several hundred thousand or more. The reliability of the system of the present invention is increased many times over those of known systems. Although some contend that small samples may be selected in such a manner that they may be statistically accurate, even if true they are expensive, must be periodically updated, and are subject to significant statistical variation at the whim of even a single participant.

We claim:

1. A method of conducting an audience survey comprising sweeping the radiation pattern of the antenna of a radiant energy responsive monitor over a metropolitan area from a location elevated above the buildings in said area to decrease the obstructions in the radiant energy paths to said monitor from the communications receivers in said area, detecting in said monitor the local oscillator signals radiated to said antenna from said communications receiver, separating in said monitor said received signals according to their differences in frequency, and counting the number of signals received in each of a plurality of predetermined frequency bands representative of the different transmitting stations to which said communications receivers may be tuned.

2. A method of conducting a television audience survey comprising flying an aircraft carrying a radiation responsive monitor having an antenna over a metropolitan area so that the radiation pattern of said antenna sweeps over the television receivers in said area from a location elevated above the buildings in said area to decrease the obstructions in the radiant energy paths from said television receivers to said antenna, detecting in said monitor the local oscillator signals radiated to said antenna from said television receivers, comparing said local oscillator signals in said monitor with a variable frequency monitor signal to ascertain the frequency of each local oscillator signal, and counting in said monitor the number of said local oscillator signals within each of a plurality of predetermined frequency bands representative of the different broadcasting television stations to which said television receivers may be tuned.

3. A method according to claim 2 in which said aircraft is flown through a predetermined flight path at an altitude of at least 3,500 feet above terrain.

References Cited by the Examiner

UNITED STATES PATENTS

| | | | |
|---|---|---|---|
| 2,552,585 | 5/1951 | Rahmel | 325—31 |
| 2,617,934 | 11/1952 | McMillan et al. | 343—705 |
| 2,618,747 | 11/1952 | Luck | 343—708 |
| 2,896,070 | 7/1959 | Fremont et al. | |
| 2,903,508 | 9/1959 | Hathaway | 325—31 X |
| 2,959,783 | 11/1960 | Iams | 343—854 X |
| 2,990,548 | 6/1961 | Wheeler | 343—854 X |
| 3,017,633 | 1/1962 | Marston et al. | 343—895 X |
| 3,083,364 | 3/1963 | Scheldorf | 343—895 X |
| 3,202,997 | 8/1965 | Schell | 343—854 X |

OTHER REFERENCES

Klass, Aviation Week, July 14, 1958, pp. 75–82, TL 501.A8 343–895.

Tele-Beam Industries, Radio & Television News, July 1954, pp. 43 104, TK 6540. R623 325–67.

Terman Electronic / Radio Engineering, 4th Edit., 1955 pp. 803–808, TK 6550T4.

DAVID G. REDINBAUGH, *Primary Examiner.*

JOHN W. CALDWELL, *Examiner.*